United States Patent [19]

Onodera et al.

[11] 4,383,292

[45] May 10, 1983

[54] SINGLE-ENDED SWITCHING CONVERTER

[75] Inventors: Toshihiro Onodera, Kunitachi; Youichi Masuda, Yokohama; Akira Nakajima, Yokosuka, all of Japan

[73] Assignee: Tokyo Shibaura Denki Kabushiki Kaisha, Japan

[21] Appl. No.: 255,094

[22] Filed: Apr. 17, 1981

[30] Foreign Application Priority Data

Apr. 22, 1980 [JP] Japan ................................. 55-52354

[51] Int. Cl.$^3$ ............................................ H02P 13/22
[52] U.S. Cl. .................................................... 363/21
[58] Field of Search .................. 315/408, 411; 363/16, 363/18-21, 97, 131

[56] References Cited

U.S. PATENT DOCUMENTS

| 2,915,710 | 12/1959 | Schiewe et al. | 363/18 X |
|---|---|---|---|
| 2,920,259 | 1/1960 | Light | 363/18 |
| 2,996,641 | 8/1961 | Paynter | 315/408 X |
| 3,366,807 | 1/1968 | Heffron | 315/408 X |
| 4,010,535 | 3/1977 | Hishiki et al. | 29/577 |
| 4,027,200 | 5/1977 | Sahara et al. | 363/20 X |
| 4,058,754 | 11/1977 | Ohnishi et al. | 315/411 |

FOREIGN PATENT DOCUMENTS 46-41128 4/1971 Japan ................................. 315/411
47-41118 6/1972 Japan .

OTHER PUBLICATIONS

N. Sokal et al., "Class E—A New Class of High-Efficiency Tuned Single-Ended Switching Power Amplifiers", *10 IEEE J. of Solid State Circuits*, 168, (Jun. 1975).
S. Cuk et al., "A New Optimum Topology Switching DC to DC Converter", *77 IEEE PESC Record 160*, (Jun. 1977).

*Primary Examiner*—A. D. Pellinen
*Attorney, Agent, or Firm*—Finnegan, Henderson, Farabow, Garrett & Dunner

[57] ABSTRACT

A series circuit of a transistor serving as a switching element and an input power supply is connected in parallel with the primary side inductor of a transformer. A resonance capacitor and a damping diode are connected in parallel with the transistor. When the transistor is turned on in response to a pulse signal supplied from a pulse generator, the current from a DC power supply is supplied to the transformer. At the same time, a commutating diode is turned on to supply the output current from the transformer to a load resistor.

14 Claims, 14 Drawing Figures

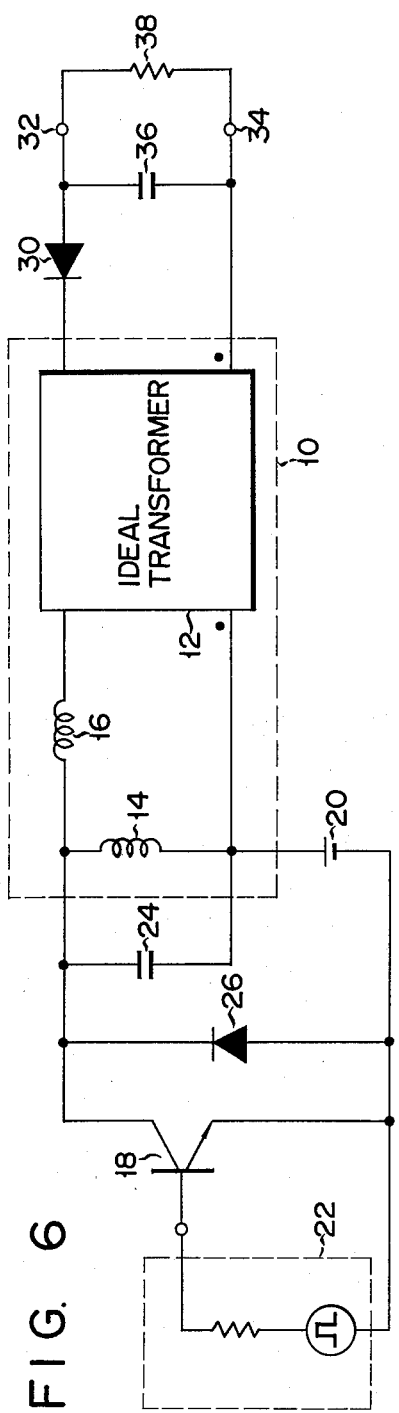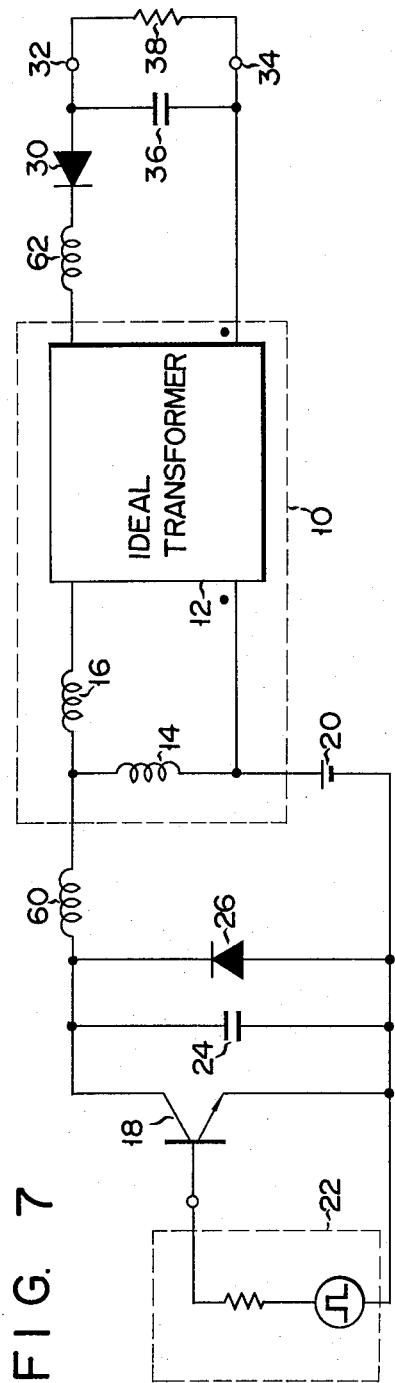

SINGLE-ENDED SWITCHING CONVERTER

This invention relates to single-ended switching converters having high switching frequency characteristics.

As the basic circuit of the single-ended switching converter there are (i) a buck power stage type, (ii) a boost power stage type, (iii) buck-boost power stage type and (iv) a boost-buck power stage type as shown in "A New Optimum Topology Switching DC-TO-DC Converter", Catalogue No. 77 CH 1213 SAES, IEEE Power Electronics Specialist, 1977, pp. 160. These four different types of basic circuits, however, have a drawback that the switching loss is increased when the switching frequency is increased to about 100 to 200 kHz. This is because of the fact that with the increase of the switching frequency the effects of the leakage inductance in the power transmission transformer and the storage capacitance of the switching transistor on the switching action are increased. With the increase of the effect on the switching action, the time constant for the rising and falling waveform portions of the voltage and current waveforms is increased, and the voltage and current waveforms are changed from rectangular form into trapezoidal form. In this case, an overlap region is produced in the voltage and current waveforms, and power corresponding to the area of this region is wasted as switching loss. In other words, the power transducing efficiency of the switching converter is deteriorated, and also a great deal of heat is generated in the transformer provided in the switching converter. Therefore, where any of the basic circuits mentioned above is operated at a high switching frequency, it is necessary to use a transformer having a large capacity and also provide a heat sink of a large size, and the size of the whole system is increased.

Further, of the aforementioned basic circuits the boost power stage type, buck-boost power stage type and boost-buck power stage type are constructed such that input power is supplied to the load only during the non-conduction period of the switching transistor. In other words, in the switching converter of above-mentioned type, in which power is supplied to the load only during the non-conduction period of the switching transistor, the primary side inductance of the transformer has to be set to a low value. Therefore, it is necessary to fabricate the core of the transformer with a low permeability material such as permalloy series alloy, for instance molybdenum-permalloy, or where the core is fabricated with a high permeability material, it is necessary to set a large transformer gap. However, the low permeability core material is expensive and increases the cost of the transformer, and where a large transformer gap is set leakage of magnetic flux is prone, leading to such undesired phenomena as power loss, heat generation and dielectric breakdown. From the above grounds, above-mentioned type switching converter is unsuited to applications where high power (of the order of 10 to 2,000 W) is transmitted.

An object of the invention is to provide a single-ended switching converter, which permits transmission of high power with very little switching loss even at a high switching frequency of the order of 100 to 200 kHz.

Another object of the invention is to provide a single-ended switching converter, which permits the use of a small size transformer.

In the single-ended switching converter according to the invention, a switching circuit, which is on-off operated according to a predetermined signal and supplies the current from a power supply to the transformer in its "on" state, is connected to the primary side of the transformer. Also, a capacitor connected in parallel with the switching circuit and having a predetermined capacitance and a first means connected in parallel with the switching circuit and turned on at the instant when the potential on one end of the capacitor becomes a predetermined potential, thereby preventing the potential on that end of the capacitor from becoming lower than the predetermined potential, are provided. Further, a second means is connected to the secondary side output terminal of the transformer and turned on during the "on" state of the switching means, thereby supplying a load with a power generated from the DC power supply. Thus, the slope of the rising of terminal voltage across the capacitor after the turning-off of the switching means becomes gentle due to the first means, so that switching loss is held within a very low level even at a high switching frequency. Further, the power generated from the DC power supply is directly supplied to the load by the second means, so that high power can be supplied to the load.

This invention can be more fully understood from the following detailed description when taken in conjunction with the accompanying drawings, in which:

FIG. 6 is a circuit diagram showing a second embodiment of the invention; and

FIG. 7 is a circuit diagram showing a third embodiment of the invention.

Figure 1:
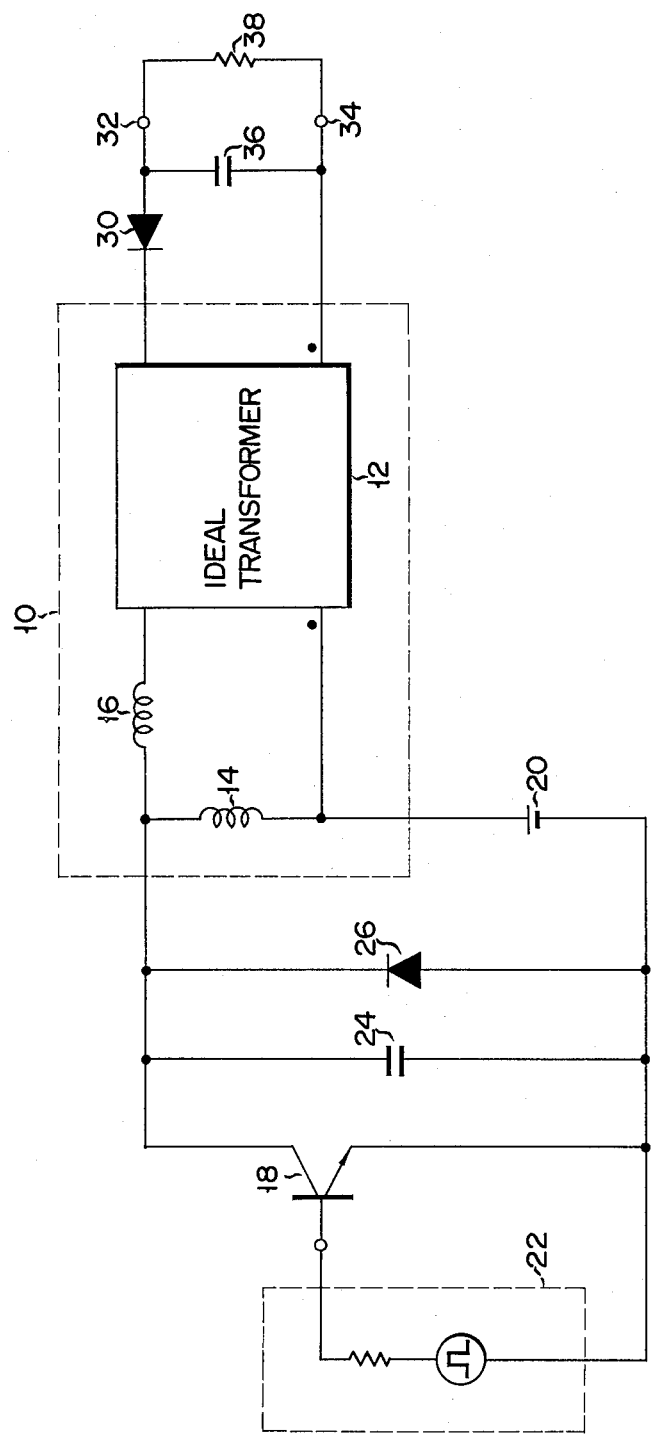
FIG. 1 is a circuit diagram showing a first embodiment of the single-ended switching converter according to the invention.

In the first embodiment of the invention shown in FIG. 1, a transformer 10 is shown to be equivalent to an ideal transformer 12, a primary side inductor 14 and a leakage inductor 16, which represents the primary side sum of the secondary side inductance and leakage inductance peculiar to the transformer 10. In other words, the circuit of the primary side inductor 14 and leakage inductor 16 in series with each other is connected in parallel with the input side of the ideal transformer 12. The juncture between the one end of primary side inductor 14 and leakage inductor 16 is connected to the collector of an NPN transistor 18 which serves as a switching element. The emitter of the transistor 18 is connected through an input power supply 20 which is represented by a DC power supply to the second end of the primary side inductor 14; the positive and negative terminals of the input power supply 20 are respectively connected to the second end of the primary side inductor 14 and the emitter of the transistor 18. A pulse generator 22 of a well-known construction is connected between the base and emitter of the transistor 18. The transistor 18 is on-off switched according to a pulse signal supplied from the pulse generator 22. A resonance capacitor 24 and a damping diode 26 are connected in parallel between the collector and emitter of the transistor 18. The anode of the damping diode 26 is connected to the junction between the emitter of the transistor 18 and the negative terminal of the input power supply 20. The cathode of the damping diode 26 is connected to the collector of the transistor 18. One of the output terminals of the ideal transformer 12 is connected to the cathode of a commutating diode 30, which has its anode connected to an output terminal 32. The other output terminal of the ideal transformer 12 is directly connected to an output terminal 34. A smoothing capacitor 36 is connected between the anode of the commutating diode 30 and the output terminal of the ideal transformer 12 or the output terminal 34. Thus, the voltage appearing on the secondary side of the transformer, i.e., between the output terminals of the ideal transformer 12, is converted into a DC voltage through the commutating diode 30 and smoothing capacitor 36 and supplied to a load resistor 38 through the output terminals 32 and 34.

The conditions for setting the circuit constants in the individual elements in the above construction are as follows:

$$\frac{1}{T} \approx \frac{1}{2\pi \sqrt{L_1 C_r}} \quad (1)$$

$$C_r > C_p \quad (2)$$

$$E_i > n \cdot E_0 \quad (3)$$

$$L_1/10 \leq L_2 \leq 5L_1 \quad (4)$$

where T is the switching period of the transistor 18, $C_p$ is the storage capacitance between the collector and emitter of the transistor 18, $C_r$ is the capacitance of the resonance capacitor 24, $L_1$ is the inductance of the primary side inductor 14, $L_2$ is the inductance of the leakage inductor 16, $E_i$ is the voltage of the input power supply, i.e., the input voltage to the transformer 10, $E_0$ is the normal output voltage of the transformer 10, and n is the turns ratio of the transformer 10.

According to Formula (1), the resonant frequency of the resonance capacitor 24 and the primary side inductor 14 of the transformer 10 is set to be substantially equal to the switching frequency of the transistor 18. According to Formula (2), the capacitance of the resonance capacitor 24 is selected to be sufficiently high with respect to the storage capacitance between the collector and emitter of the transistor 18. According to Formula (3), the primary side voltage value $n \cdot E_0$ of the transformer 10 corresponding to the output voltage $E_0$ thereof is set to be low compared to the input voltage $E_i$. According to Formula (4), the inductance $L_2$ of the leakage inductor 16 of the transformer 10 is selected to be within a range centered on the inductance $L_1$ of the primary side inductor 14, preferably from 0.1 to 5 times $L_1$. Thus, by considering the conditions of Formulas (1) to (4) in the embodiment of FIG. 1, T, $C_p$, $C_r$, $L_1$, $L_2$, $E_i$, $E_0$ and n are set, for instance, to be T = 8.8 μsec
$C_p$ = 500 pF
$C_r$ = 149,500 pF
$L_1$ = 250 μH
$L_2$ = 50 μH
$E_i$ = 140 V
$E_0$ = 30 V
n ≈ 4

Figure 2A:
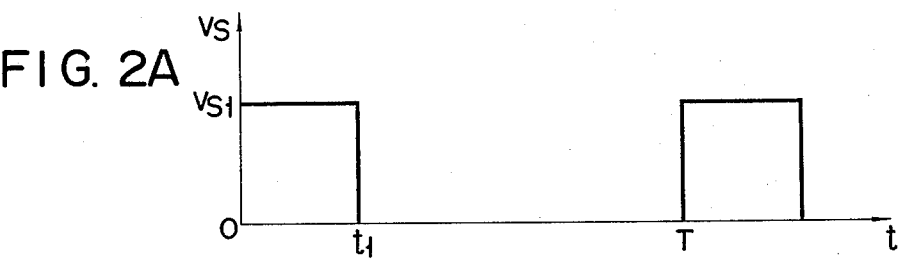
FIGS. 2A to 2E show a waveform chart illustrating the operation of the single-ended switching converter shown in FIG. 1.
Figure 2B:
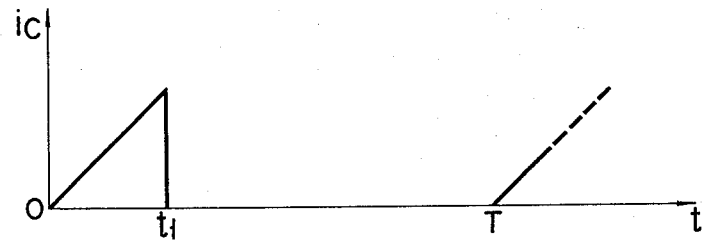
Figure 2C:
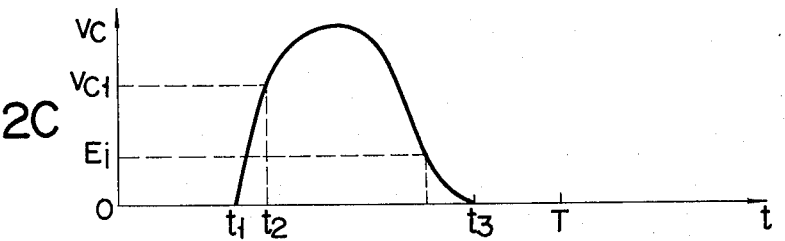
Figure 2D:
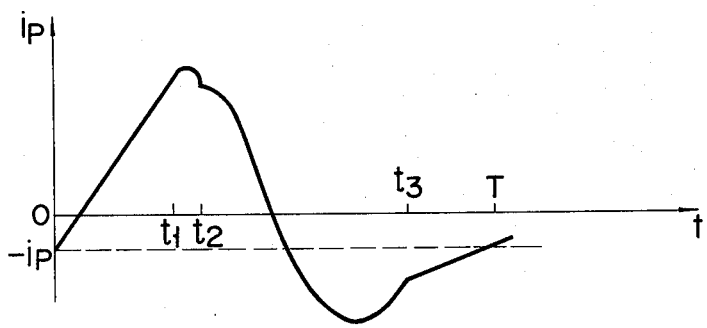
Figure 2E:
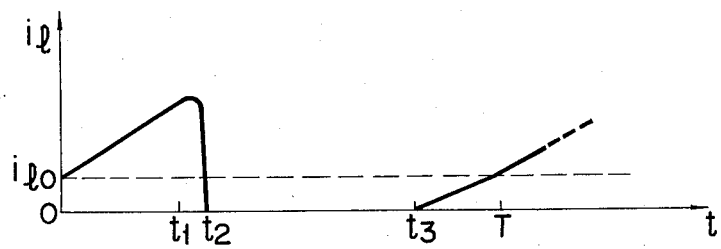
Figure 3A:
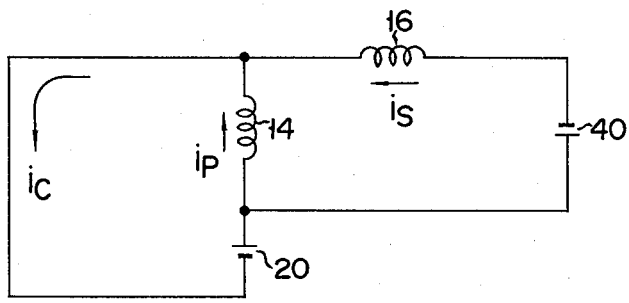
FIGS. 3A to 3D are circuit diagrams showing equivalent circuits of the single-ended switching converter of FIG. 1 in main operation periods thereof.

When a pulse signal which assumes a high level $v_s = v_{sl}$ for a period between an instant t=0 and an instant t=$t_1$ as shown in FIG. 2A is supplied from the pulse generator 22 to the transistor 18, the transistor 18 is turned on. Since the relation of the input and output voltages of the transformer 10 is $E_i > n \cdot E_0$ according to Formula (3), the commutating diode 30 is turned on at this time. FIG. 3A shows the equivalent circuit of the converter in this state. Here, a DC power supply 40 with the primary side voltage $n \cdot E_0$ corresponding to the output voltage is connected in parallel with the series circuit of the primary side inductor 14 and leakage inductor 16. Thus, current flows through the inductors 14 and 16 in the direction of arrows $i_p$ and $i_s$, and the current $i_c$ through the transistor 18 increases linearly for the period between the instants t=0 and t=$t_1$ as shown in FIG. 2B. Also, as seen in FIG. 2E the load current $i_l$ through the load resistor 38 increases linearly from a predetermined initial level $i_{l0}$ corresponding to the primary current for the aforementioned period between the instant t=0 and t=$t_1$.

Figure 3B:
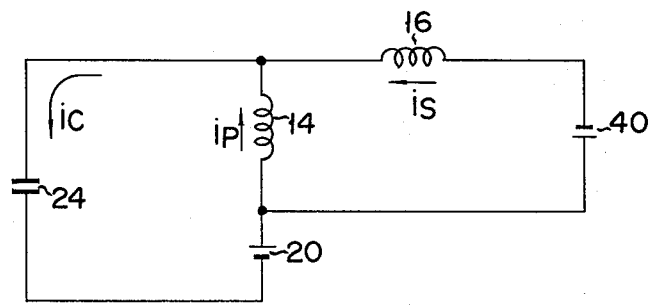

With the subsequent falling of the pulse signal generated by the pulse generator 22 to a low level, i.e., $v_s = 0$, at the instant t=$t_1$ as shown in FIG. 2A, the transistor 18 is turned off, that is, the current $i_c$ through the transistor 18 is reduced to $i_c = 0$ at the instant t=$t_1$. FIG. 3B shows the equivalent circuit of the converter at this time. Here, the resonance capacitor 24 is connected between the juncture between the primary side inductor 14 and leakage inductor 16 and the minus terminal of the input power source 20. This means that the current $i_p$ and $i_s$ through the primary side inductor 14 and leakage inductor 16 continuously flows even after the current $i_c$ through the transistor 18 is reduced to zero. The current $i_p$ and $i_s$ after the transistor 18 is turned off flows into the capacitor 24 to charge the capacitor 24. Thus, the voltage $v_c$ at the terminal of the resonance capacitor on the side thereof connected to the collector of the transistor 18 and the cathode of the damping diode 26 starts to rise from $v_c = 0$ at the instant t=$t_1$ and assumes a value $v_{cl}$ at an instant t=$t_2$. The sum of the voltage $v_{cl}$ across the resonance capacitor 24 and the terminal voltage $v_{L2}$ of the leakage inductor 16 is equal to the difference between the input voltage $E_i$ of the transformer 10 and the equivalent output voltage $n \cdot E_0$. That is, there holds the relation $$v_{cl} + v_{L2} = E_i - n \cdot E_0 \quad (5)$$

Thus, at the instant t=$t_1$ the potential difference between the anode and cathode of the commutating diode 30 is reduced to zero to turn off the diode 30. After the instant t=$t_1$, a resonance phenomenon is produced by the harmonic mean inductance of the primary side inductor 14 and leakage inductor 16 and the capacitance $C_r$ of the resonance capacitor 24, and the current $i_p$ through the primary side inductor 14 of the transformer 10 reaches a peak or a maximum value during the period between the instants t=$t_1$ and t=$t_2$. While the load current $i_l$, i.e., the current $i_s$ through the leakage inductor 16, is reduced to $i_l = 0$ at the instant t=$t_2$ as shown in FIG. 2E with the turning-off of the commutating diode 30 as mentioned previously, the current $i_p$ is not completely reduced to zero at the instant t=$t_2$.

Figure 3C:
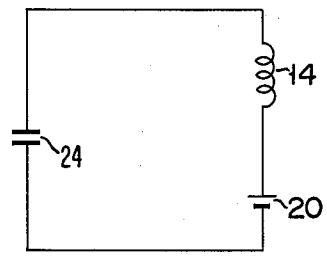

With the cutting-off of the commutating diode 30, the leakage inductor 16 and equivalent DC power supply 40 are separated after the instant t=t₂, as shown by an equivalent circuit of FIG. 3C. Even in this state, the current $i_p$ through the primary side inductor 14 of the transformer 10 continually flows to the cause further charging of the resonance capacitor 24. Thus, the resonance capacitor 24 resonates with the primary side inductor 14, and the terminal voltage $v_c$ across the resonance capacitor 24 is further increased to reach a peak as shown in FIG. 2C. Subsequently, the electric energy stored in the resonance capacitor 24 is returned to the primary side inductor 14, and with this discharge the voltage across the resonance capacitor 24 is reduced to eventually become $v_c=0$ at an instant t=t₃. During the period from the instant t=t₂ to the instant t=t₃, the current $i_p$ through the primary side inductor 14 has a waveform of the differential of the voltage $v_c$ of the resonance capacitor 24 as shown in FIG. 2D. When the voltage $v_c$ takes the maximum value, the current $i_p$ is $i_p=0$, and it subsequently assumes the negative potential. When the voltage $v_c$ becomes equal to the input voltage $E_i$, the current $i_p$ takes a minimum value, and after the instant t=t₃, i.e., after the voltage $v_c$ across the resonance capacitor 24 is reduced to zero, the current $i_p$ increases linearly and takes the value at t=0, i.e., $-i_{p0}$, at an instant t=T.

Figure 3D:
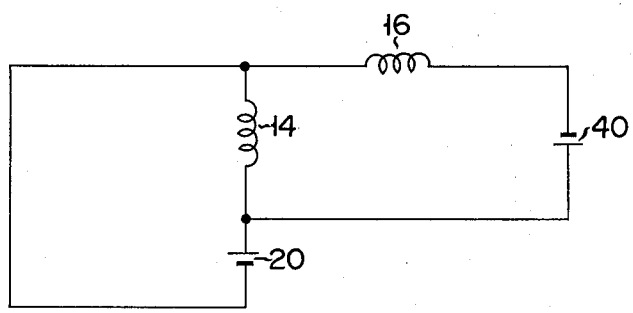

When the voltage $v_c$ across the resonance capacitor 24 becomes zero at the instant t=t₃, the damping diode 26 is turned on. Thus, further falling of the voltage $v_c$ across the resonance capacitor 24 in the negative direction is inhibited, and the state of $v_c=0$ is maintained as shown in FIG. 2C. FIG. 3D shows the equivalent circuit of the converter in this state. Here, the series circuit of the leakage inductor 16 and the equivalent DC power supply 40 is connected in parallel with the primary side inductor 14, and the negative terminal of the input power supply 20 and the juncture between the primary side industor 14 and leakage inductor 16 are connected to each other. Thus, at the instant t=t₃ the current $i_p$ through the primary side inductor 14 returns to the input power supply 20. Also, the current $i_l$ through the load resistor 38 increases linearly from the instant when the voltage $v_c$ across the resonance capacitor 24 becomes zero, i.e., from the instant t=t₃, according to Formula $$i_l = (E_i - E_{0l})/L_2 \tag{6}$$

and becomes $i_l=i_{l0}$ at the instant t=T. At this time, the sum of the current $i_p$ through the primary side inductor 14 and the current $i_l$ through the load resistor 38 becomes zero, and current through the damping diode 26 vanishes. At this instant, one period of the operation of the transistor 18 is ended.

At the instant t=T, another pulse signal of the high level $v_{sl}$ is supplied from the pulse generator 22 to the transistor 18. Subsequently, entirely the same operation as the operation from the instant t=0 as described earlier takes place, so its description is omitted.

Figure 4:
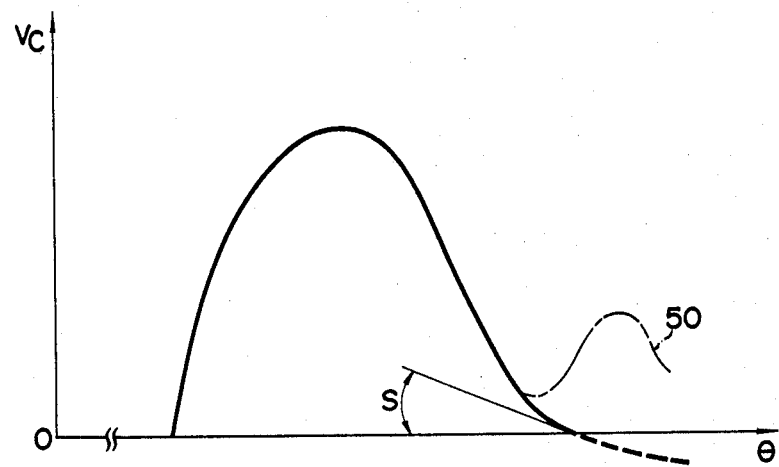
FIG. 4 is a graph showing the waveform of the voltage across a transistor provided as a switching element in the first embodiment of FIG. 1.

To realize the operation described above, it is necessary to appropriately set the switching period T of the transistor 18, the capacitance $C_r$ of the resonance capacitor, the primary side inductance $L_1$ and leakage inductance $L_2$ of the transformer 10, etc. as in Formulas (1) to (4). In other words, while the terminal voltage $v_c$ across the resonance capacitor 24 gently rises after the instant t=t₁ of the turning-off of the transistor 18 and reaches the maximum value at the instant of the turning-off of the commutating diode 30, it is necessary in order to realize a quasi-E class operation that the voltage $v_c$ is subsequently reduced by the resonance phenomenon produced by the resonance capacitor 24 and primary side inductor 14 and reaches zero before the instant when the transistor 18 is turned on again. To realize this quasi-E class operation, it is necessary that the instant when the voltage $v_c$ across the resonance capacitor 24 crosses the point of $v_c=0$ in its falling waveform part occur before the instant t=T of the turning-on of the transistor 18 again. The slope S of the voltage $v_c$ at the zero crossing point in FIG. 4 is given as $$S(1/\text{rad}) = -\frac{1}{V_{max}}\left(\frac{dV}{d\theta}\right) \tag{7}$$

where $V_{max}$ is the maximum voltage, and $\theta$ is the phase angle $(=\omega t)$. The capacitance $C_r$ of the resonance capacitor 24, inductances $L_1$ and $L_2$ and period T of the transistor have to be set such that the voltage slope S satisfies $$0 \leq S < 1 \tag{8}$$

Figure 5:
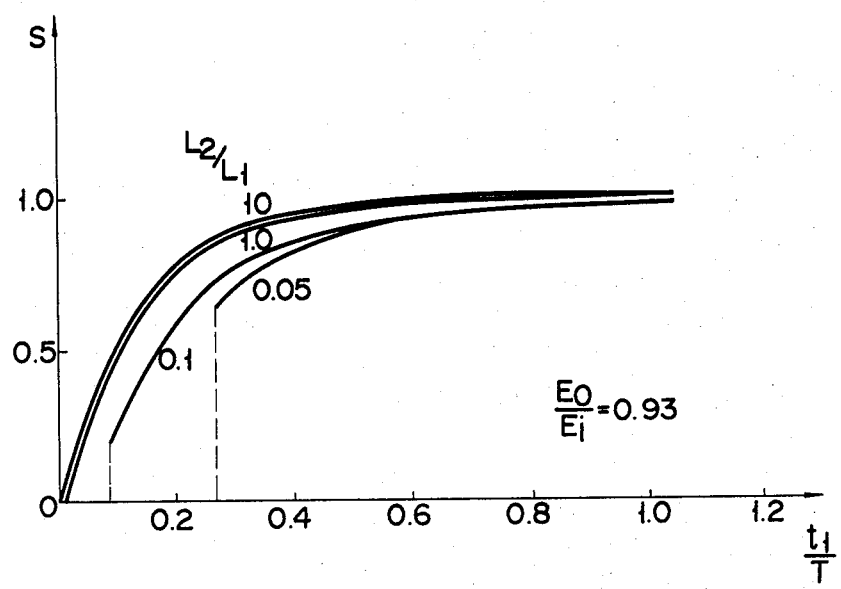
FIG. 5 is a graph showing the relation between the duty ratio of the transistor in the first embodiment of FIG. 1 and the slope S of the voltage $v_c$ shown in FIG. 4 at the zero crossing point.

FIG. 5 shows the relationship between the voltage slope S and duty ratio $t_1/T$ of the transistor 18 with the inductance ratio $L_2/L_1$ uses as the third parameter. When the inductance ratio $L_2/L_1$ is large, for instance above 10, the condition of Formula (8) can be met over the entire range of the duty ratio $t_1/T$ (where $1/T \approx \frac{1}{2}\pi\sqrt{L_1C_r}$). However, when the inductance ratio $L_2/L_1$ is reduced, the duty ratio region over which the condition of Formula (8) is satisfied is limited. For example, the condition is met only over a region of $t_1/T \geq 0.01$ when the the inductance ratio is $L_2/L_1=1.0$, only over a region of $t_1/T \geq 0.09$ when the ratio is 0.1 and only over a region of $t_1T \geq 0.275$ when the ratio is 0.05. In other words, it will be understood that when the inductance $L_1$ of the primary side inductor 14 is greater than the inductance $L_2$ of the leakage inductor 16, it is necessary to reduce the period T of the transistor 18 or the conduction period of the transistor 18 (i.e., the period between the instants t=t₀ and t=t₁) so that sufficient energy for the falling of the voltage $v_c$ to the zero potential level may be stored in the primary side inductor 16. If the aforementioned condition is not fulfilled, the voltage $v_c$ would rise again without reaching the zero level as shown by a curve 50 in FIG. 4. This occurs because a resonance phenomenon is brought about again by the resonance capacitor 24 and primary side inductor 14. In this case, when the transistor 18 is turned on again, a harmonic voltage of a spike-like form is generated in the transistor 18 to increase the switching loss. For the above reason, it will be understood that adequate setting of the individual circuit constants to satisfy the conditions of Formulas (1) to (4) is necessary.

With the first embodiment of the invention, of the construction and operation described above, since the resonance capacitor 24 is connected in parallel with the transistor 18 serving as the switching element, the slope of the rising of the terminal voltage $v_c$ across the resonance capacitor 24 after the turning-off of the transistor 18 is gentle. This voltage $v_c$ is the same as the voltage between the collector and emitter of the transistor 18. Thus, the area of the overlap of the rising part of the waveform of the current $i_c$ through the transistor 18 and the rising part of the waveform of the voltage $v_c$ between the collector and emitter of the transistor 18 is very small, so that it is possible to hold the switching loss to be within a very low level even where the switching frequency of the transistor 18 is as high as 100 to 200 kHz. In addition, since the commutating diode 30 is provided between the transformer 10 and the output terminal 32, with its anode connected to the output terminal 32 and its cathode to the transformer 10, power from the input power supply 20 can be directly supplied to the load during the period between the conduction period of the transistor 18 (between the instants $t=0$ and $t=t_1$) and the conduction period of the damping diode 26 (between the instants $t=t_3$ and $t=T$). Thus, high power can be supplied to the load. Further, neither the core of the transformer need be formed with an expensive low permeability material nor it is necessary to set a large gap of the transformer. That is, it is possible to form a transformer having a small gap with an inexpensive high permeability material and also reliably prevent power loss, heat generation, dielectric breakdown, etc. Thus, size and cost reduction of the transformer and high power transducing efficiency can be realized.

Further, since the switching loss in the transistor 18 can be reduced as mentioned, it is possible to prevent heat generation in the transistor 18. Thus, the heat sink can be dispensed with, and the transistor can be reduced in size. In addition, introduction of external noise through the heat sink can be eliminated to improve the noise characteristics of the switching converter. Further, since the rising and falling slopes of the terminal voltage $v_c$ across the resonance capacitor 24 is gentle as shown in FIG. 2C, the generation of harmonic components can be prevented, thus permitting further improvement of the noise characteristics of the switching converter.

FIG. 6 shows a second embodiment of the invention. In this embodiment, the resonance capacitor 24 is connected in parallel with the primary side inductor 14 of the transformer 10 and in the neighborhood of the inductor 14. The other construction of this embodiment is the same as in the first embodiment of FIG. 1, and like parts are designated by like reference numerals and not described any further. In the second embodiment, with the resonance capacitor 24 connected in parallel with the primary side inductor 14, when the transistor 18 continues to be non-conductive for preventing the excess current, the introduction of the terminal voltage across the transistor 18 can be prevented. Thus, when the transistor 18 is turned on again in this state, the generation of the excessive current can be reliably prevented.

FIG. 7 shows a third embodiment of the invention. In this embodiment, the juncture between the primary side inductor 14 and leakage inductor 16 of the transformer 10 is commonly connected through an auxiliary inductor 60 to the collector of the transistor 18, the resonance capacitor 24 and the cathode of the damping diode 26. Also, one of the secondary side terminals of the ideal transformer 12 of the transformer 10 is connected through a separate auxiliary inductor 62 to the cathode of the commutating diode 30. The rest of the construction is the same as in the preceding embodiments of FIGS. 1 and 6. In this embodiment, with the auxiliary inductors 60 and 62 respectively connected to the primary and secondary sides of the transformer 10, if the ratio of the transformation of the transformer is small and the inductance $L_2$ of the equivalent leakage inductor 16 is low, these auxiliary inductors 60 and 62 have the effect of increasing the leakage inductance $L_2$. Thus, the individual circuit constants can be readily set to satisfy the conditions of Formulas (1) to (4).

Although the present invention has been shown and described with respect to particular embodiments, nevertheless, various changes and modifications which are obvious to a person skilled in the art to which the invention pertains are deemed to lie within the spirit, scope and contemplation of the invention. For example, while the NPN transistor 18 has been used as the switching element, it is also possible to use any other element which can be held on and off for desired periods. Also, while the diodes 26 and 30 have been used as elements for permitting currents in predetermined directions, they can of course be replaced with transistors.

What we claim is:

1. A single-ended switching converter comprising:
   a. a transformer having primary side inputs, secondary side outputs, and a primary inductance $L_1$ and a leakage inductance $L_2$ satisfying the condition:

$$L_1/10 \leq L_2;$$

b. switching means connected to the primary side inputs of said transformer for performing on-off operation according to a predetermined signal, said switching means supplying current from a DC power supply to said transformer when said switching means is in the "on" state;
   c. a capacitor connected in parallel with said switching means and having a predetermined capacitance;
   d. first means connected in parallel with said switching means to be conductive when the potential on one terminal of said capacitor becomes a predetermined potential, for preventing the potential on said one terminal of said capacitor from becoming lower than said predetermined potential; and
   e. second means connected to one of said secondary side outputs of said transformer to be conductive during the "on" state of said switching means, for supplying a load with power generated from the DC power supply, said load being connected between said second means and another secondary side output of said transformer.

2. A single-ended switching converter according to claim 1, wherein said transformer has a turns ratio n satisfying the condition:

$$E_i > n \cdot E_o,$$

where $E_i$ is the voltage of said DC power supply and $E_o$ is the output voltage appearing at said secondary side outputs of said transformer.

3. A single-ended switching converter according to claim 1, wherein said switching means includes a transistor on-off operated with a predetermined operation period T in response to a pulse signal supplied to the base of said transistor.

4. A single-ended switching converter according to claim 1, wherein said first means includes a semiconductor diode.

5. A single-ended switching converter according to claim 1, wherein said second means includes a semiconductor diode.

6. A single-ended switching converter according to claim 3, wherein said transistor has a predetermined storage capacitance $C_p$ satisfying the condition:

$$C_r > C_p,$$

where $C_r$ is the capacitance of said capacitor.

7. A single-ended switching converter according to claim 3, wherein the inverse of said operation period T of said transistor is set to be substantially equal to a resonant frequency determined by said capacitor and said primary inductance, namely:

$$\frac{1}{T} \approx \frac{1}{2\pi \sqrt{L_1 C_r}},$$

where $C_r$ is the capacitance of said capacitor.

8. A single-ended switching converter according to claim 7, wherein the terminal voltage across said capacitor varies according to a resonance phenomenon produced by said capacitor and said inductances of said transformer, the falling slope S of said terminal voltage at the zero crossing point being:

$$S = \frac{1}{V_{max}} \left( \frac{dV}{d\theta} \right),$$

where $V_{max}$ is the maximum value of said terminal voltage, $\theta$ is the phase angle, and the capacitance of said capacitor and the primary inductance of said transformer are selected such that said slope S meets the condition:

$$0 \leq S < 1.$$

9. A single-ended switching converter according to claim 4, wherein said switching means includes an NPN conductivity type transistor having an emitter electrode connected to one primary side input of said transformer through said DC power supply and a collector electrode connected to another primary side input of said transformer, and said semiconductor diode of said first means has an anode electrode connected to the emitter electrode of said transistor and a cathode electrode connected to the collector electrode of said transistor.

10. A single-ended switching converter comprising:
 a. a transformer having a primary side input, a secondary side input, and a primary inductance and a leakage inductance;
 b. inductor means connected to said transformer for keeping said leakage inductance of said transformer greater than a predetermined value;
 c. switching means connected to said primary side input of said transformer for performing on-off operation according to a predetermined signal, said switching means supplying current from a DC power supply to said transformer when said switching means is in the "on" state;
 d. a capacitor connected in parallel with said switching means and having a predetermined capacitance;
 e. first diode means connected in parallel with said switching means to be conducted when the potential on one terminal of said capacitor becomes a predetermined potential, for preventing the potential on said one terminal of said capacitor from becoming lower than said predetermined potential; and
 f. second diode means connected to the secondary side output of said transformer to be conductive during the "on" state of said switching means, for supplying a load with power generated from said DC power supply.

11. A single-ended switching converter according to claim 10, wherein said inductor means has a predetermined inductance such that:

$$L_1/10 \leq L_2 \leq 5L_1,$$

where $L_1$ is said primary inductance and $L_2$ equals the sum of said leakage inductance and said predetermined inductance.

12. A single-ended switching converter according to claim 10, wherein said inductor means includes an auxiliary inductor which is connected between said primary side input of said transformer and said switching means.

13. A single-ended switching converter according to claim 10, wherein said inductor means includes an auxiliary inductor which is connected between said secondary side output of said transformer and said second diode means.

14. A single-ended switching converter according to claim 10, wherein said inductor means includes:
 a. a first auxiliary inductor which is connected between said primary side input of said transformer and said switching means; and
 b. a second auxiliary inductor which is connected between said secondary side output of said transformer and said second diode means.

* * * * *